United States Patent
Battaglia et al.

(10) Patent No.: US 12,024,647 B2
(45) Date of Patent: Jul. 2, 2024

(54) CORROSION PROTECTION PIGMENT COMPRISING COATED METAL PARTICLES AND ITS USE

(71) Applicant: Ewald Dörken Ag, Herdecke (DE)

(72) Inventors: Carolina Battaglia, Hagen (DE);
Susanne Walter, Herdecke (DE);
Verena Grossmann, Herdecke (DE);
Marcel Roth, Düsseldorf (DE); Sandra Böhm, Ennepetal (DE); Gerhard Reusmann, Essen (DE)

(73) Assignee: Ewald Dörken Ag (DE)

(*) Notice: Subject to any disclaimer, the term of this patent is extended or adjusted under 35 U.S.C. 154(b) by 0 days.

(21) Appl. No.: 15/794,156

(22) Filed: Oct. 26, 2017

(65) Prior Publication Data
US 2018/0305558 A1    Oct. 25, 2018

(30) Foreign Application Priority Data
Oct. 28, 2016 (EP) .................... 161963434

(51) Int. Cl.
*C09C 1/62* (2006.01)
*C09C 3/06* (2006.01)
(Continued)

(52) U.S. Cl.
CPC ............ *C09D 5/084* (2013.01); *C09C 1/62* (2013.01); *C09C 1/625* (2013.01); *C09C 3/063* (2013.01);
(Continued)

(58) Field of Classification Search
CPC ......... C09C 1/642; C09C 2200/1058; C09C 2220/106; C09C 1/62; C01P 2004/20;
(Continued)

(56) References Cited

U.S. PATENT DOCUMENTS

| | | | | |
|---|---|---|---|---|
| 2,885,366 A | * | 5/1959 | Iler | B82Y 30/00 106/446 |
| 3,128,152 A | * | 4/1964 | Secord | C01B 7/194 423/483 |

(Continued)

FOREIGN PATENT DOCUMENTS

| | | |
|---|---|---|
| DE | 102010007147 A1 | 8/2011 |
| DE | 102013209030 A1 * | 12/2014 ....... C23C 16/45555 |

(Continued)

OTHER PUBLICATIONS

Ono et al., Improvement of Corrosion Resistance of Metals by an Environmentally Friendly Silica Coating Method, Journal of Sol-Gel Science and Technology 29, 147-153, 2004 (Year: 2004).*

(Continued)

*Primary Examiner* — Hoa (Holly) Le
(74) *Attorney, Agent, or Firm* — Edward E. Sowers; Brannon Sowers & Cracraft PC

(57) ABSTRACT

The present invention relates to modified-metal -particles for corrosion-protection coatings 16 a method for their production and their use anti-corrosive coating compositions and methods for their use. The coating compositions include modified metal particles and a binding agent. The modified metal particles can include zino, aluminum, magnesium, bismuth, tin, nickel, or manganese as well as their mixtures and alloys thereof and have an inorganically-based surface modification in the form of a coating layer capable of imparting cathodic corrosion protection. Suitable surface modifications include a coating layer formed by an inorganic oxide including silicon dioxide, titanium oxide, zirconium oxide, and mixtures thereof.

12 Claims, 2 Drawing Sheets

(51) Int. Cl.
  *C09D 1/00* (2006.01)
  *C09D 5/08* (2006.01)
  *C01B 33/12* (2006.01)
  *C01G 23/04* (2006.01)
  *C01G 25/02* (2006.01)
  *C22C 18/00* (2006.01)

(52) U.S. Cl.
  CPC ............... *C09D 1/00* (2013.01); *C01B 33/12* (2013.01); *C01G 23/04* (2013.01); *C01G 25/02* (2013.01); *C01P 2004/60* (2013.01); *C01P 2004/86* (2013.01); *C01P 2006/12* (2013.01); *C22C 18/00* (2013.01)

(58) Field of Classification Search
  CPC .............. C01P 2004/61; C01P 2004/62; C01P 2004/86; Y10T 428/2991; Y10T 428/2993; C09D 5/08; C09D 5/082
  USPC .................................................. 428/403–406
  See application file for complete search history.

(56) References Cited

U.S. PATENT DOCUMENTS

| | | | | |
|---|---|---|---|---|
| 4,891,394 A * | 1/1990 | Savin | ................ | C09D 5/10 523/442 |
| 5,338,348 A * | 8/1994 | Savin | ................ | C08K 3/08 106/14.05 |
| 6,440,208 B1 * | 8/2002 | Christie | ................ | C23C 28/322 106/415 |
| 7,615,257 B2 | 11/2009 | Jung et al. | | |
| 2002/0017164 A1 | 2/2002 | Endo et al. | | |
| 2004/0062873 A1 | 4/2004 | Jung et al. | | |
| 2004/0180010 A1 * | 9/2004 | Andes | ................ | C09C 1/0015 424/63 |
| 2004/0191555 A1 * | 9/2004 | Germano | ................ | B05D 7/53 428/553 |
| 2004/0194663 A1 * | 10/2004 | Li | ................ | A61Q 1/12 106/403 |
| 2005/0241530 A1 * | 11/2005 | Bruckner | ............ | A61K 8/0266 106/415 |
| 2009/0169892 A1 * | 7/2009 | Bazzi | ................ | B01J 13/02 428/404 |
| 2013/0035400 A1 * | 2/2013 | Nguyen | ................ | C09D 5/028 106/483 |
| 2013/0048917 A1 | 2/2013 | Virtanen et al. | | |
| 2013/0168612 A1 * | 7/2013 | Matzdorf | ............... | C09D 5/082 252/513 |
| 2016/0108251 A1 * | 4/2016 | Kim | ................ | C09D 183/04 523/435 |
| 2017/0306159 A1 | 10/2017 | Lang et al. | | |

FOREIGN PATENT DOCUMENTS

| | | | | |
|---|---|---|---|---|
| EP | 2333021 A1 * | 6/2011 | ............. | C08G 77/14 |
| JP | S42-016529 B | 9/1967 | | |
| JP | H06-009897 B2 | 1/1994 | | |
| JP | 2001131443 A | 5/2001 | | |
| JP | 2002047433 A | 2/2002 | | |
| JP | 2005120285 A | 5/2005 | | |
| JP | 2010185075 A | 8/2010 | | |
| WO | WO 98./53011 | * 11/1998 | | |
| WO | 2005090502 A2 | 9/2005 | | |
| WO | WO-2010043708 A1 * | 4/2010 | ............... | B05D 5/00 |
| WO | WO-2015090621 A1 * | 6/2015 | ............. | C23C 10/28 |
| WO | 2016059033 A1 | 4/2016 | | |

OTHER PUBLICATIONS

Translation WO 2010043708 (Year: 2010).*
Translation JPH069897A (Year: 1994).*
Translation DE-102013209030-A1 (Year: 2014).*

* cited by examiner

US 12,024,647 B2

CORROSION PROTECTION PIGMENT COMPRISING COATED METAL PARTICLES AND ITS USE

CROSS-REFERENCE TO RELATED APPLICATION

This application claims the benefit of European Application No. EP 16 196 343.4 filed on Oct. 28, 2016, and incorporates all by reference herein, in its entirety.

BACKGROUND

The present invention relates to the technical field of corrosion protection, particularly cathodic corrosion protection coatings.

In particular, the present invention relates to modified metal particles, their use in anticorrosive coating compositions as well as a method for producing them.

The present invention further relates to anticorrosive coating compositions which contain surface-modified metal particles, as well as the use of the anticorrosive coating compositions for producing corrosion protection coatings.

The present invention finally relates to corrosion protection coatings which are produced using the aforementioned anticorrosive coating compositions, or which contain modified metal particles.

Corrosion phenomena in metals are observed on all metals and in all technical fields. They are of great technical and commercial importance because the durability or the period of application of machines, vehicles, industrial facilities or also of buildings frequently depends crucially on the corrosion properties of the metals used. As a result of corrosion, metal parts must be replaced or maintained which is always accompanied by expenditures and time, material and costs.

According to DIN EN ISO 8004, corrosion is the physicochemical interaction between a metal and its surroundings which leads to a change of the properties of the metal and can result in significant impairments of the function of the metal, the surroundings, or the technical system, in which the metals are used. As a rule, the corrosion of metals are electrochemical processes, namely the oxidation of metals due to oxygen possibly in the presence of aqueous electrolyte solutions, forming metal oxide layers.

Since corrosion processes frequently determine the durability or period of application of metals or metal coatings, it is meaningful to decrease the corrosion susceptibility and corrosion rate of the metals. In order to protect metals from corrosion, passive systems, among others, such as coatings or protective varnishes are used which are supposed to protect the metal from environmental impacts and thus from corrosion.

However, a far better corrosion protection is provided by active systems, particularly the so-called cathodic corrosion protection, with which the metal is used as a cathode—either by applying an outer voltage or through contact with a less noble metal, i.e. a metal with a lower standard electrode potential—and thus protected from oxidation.

The most common form of cathodic corrosion protection is the coating of metal parts with a metal less noble than the metal to be protected. Due to its low electrode potential, the easy availability, and the reasonable procurement costs, metallic zinc is frequently used for such cathodic corrosion protection coatings which is applied to steel sheets or steel components either from the smelting plant in the course of the so-called hot-dip galvanizing or by means of galvanic precipitation, the so-called galvanic zinc plating. However, coatings made of metallic zinc are disadvantageous because the layers have a relatively great thickness of frequently more than 100 µm, and this type of zinc coating is thus not suitable for precision components. In addition, zinc is very soft and can thus only be used to a limited extent for the coating of components which are subject to mechanical stresses, such as screw threads.

In order to avoid these specific disadvantages of hot-dip or galvanically zinc-coated metal parts, so-called zinc-flake coatings, also called zinc-flake primers, were developed, which contain flaky zinc pigments—the so-called zinc flakes—in an inorganic binding agent. The mixture of binding agents and zinc flakes is applied as a thin layer as dispersion to the metal part to be protected, which, after the curing of the binding agent, results in a closed homogenous layer with a thickness of usually 5 to 15 µm.

Despite the embedding of the zinc particles in the matrix of the binding agent, such zinc-flake coatings are electrically conductive and thus ensure a high cathodic protection at a simultaneous excellent mechanical resilience. In particular, zinc-flake coatings during the salt spray test at the scratch according to DIN EN ISO 9227 show significantly improved corrosion resistance than galvanically or electrolytically zinc-coated metal parts.

However, a disadvantage of coating compositions containing zinc pigments is that the elemental zinc of the pigments is not stable both in the acidic and the alkaline milieu and frequently is oxidized to zinc ions or zinc hydroxide or zinc oxide through the reduction of protons, when aqueous-based binding agent systems are used. As a result, the corrosion protection effect of the coating composition of the resulting corrosion protection coatings is reduced due to the formation of zinc oxide—the so-called white rust. In addition, the high reactivity of zinc in the aqueous milieu frequently leads to gas formation and unwanted thickening of the coating systems.

For these reasons, zinc coating systems with aqueous-based binding agent systems are produced only shortly before application from the educts or educt mixtures, and the coating systems are additionally mixed with passivating additives which, however, are frequently problematic toxicologically and in terms of environmental protection.

In order to prevent or at least reduce the unwanted oxidation of the zinc or zinc alloy particles, the zinc is frequently provided with a coating. For these purposes, stearic acid is usually used as coating reagent, said stearic acid being a better protection of the zinc pigments against oxidation but making a dispersion in the hydrophilic aqueous-based binding agent systems significantly more difficult. Furthermore, the zinc pigments coated with stearic acid are still unstable in aqueous systems to an extent that the coating systems also must be provided with stabilizing additives or passivating additives which, however, are frequently questionable toxicologically and to be avoided in terms of environmental protection.

DE 10 2013 113 885 A1 relates to coated metal pigments comprising a first coating layer surrounding the metal pigment comprising at least one metal oxide, and at least one second coating layer comprising at least one heteropolysiloxane. The disclosed metal pigments are protected in an aqueous milieu against oxidation and corrosion, but do no longer have a cathodic corrosion protection in coatings.

DE 10 2013 015 980 A1 also describes modified metal effect pigments having a multi-layered coating which consists of a metal oxide layer and a silane layer applied to the metal oxide layer. These metal pigments also no longer have any cathodic corrosion protection.

Therefore, the prior art still lacks metal pigments for cathodic corrosion protection coatings which are not or only to a minor degree oxidized in an aqueous milieu and can simultaneously superbly be dispersed in aqueous systems. Furthermore, there are currently no metal pigments for the cathodic corrosion protection available which can be dispersed long-time stably in aqueous systems.

SUMMARY

Therefore, the problem addressed by the present invention is that of preventing or at least diminishing the above described disadvantages linked to the prior art.

In particular, the problem addressed by the present invention is that of providing metal pigments for the cathodic corrosion protection which, when compared to metal pigments of the prior art, have a significantly longer stability in the aqueous medium and are easily dispersed in the aqueous medium through simple stirring in without further measures.

The present invention further addresses the problem of providing metal pigments for the cathodic corrosion protection which, in a coating, ensure a high cathodic corrosion protection and simultaneously have a very good white rust resistance, i.e. maintain under corrosion stress a silver white rust-free look for a significantly longer period, particularly during the neutral salt spray test according to DIN EN ISO 9227.

The present invention further addresses the problem of providing a metal pigment for the cathodic corrosion protection which is not or at least significantly slower oxidized in an aqueous milieu.

The present invention finally addresses the problem of providing a particularly aqueous-based anticorrosive coating composition that is storage-stable.

Subject matter of the present invention according to a first aspect of the present invention are thus modified metal particles as described herein; further advantageous embodiments of this invention aspect are further provided.

A further subject matter of the present invention according to a second aspect of the present invention is the use of the metal particles according to the invention.

A further subject matter of the present invention according to a third aspect of the present invention is a method for producing modified metal; further advantageous embodiments of this invention aspect are provided.

A further subject matter of the present invention according to a fourth aspect of the present invention is an anticorrosive coating composition.

A further subject matter of the present invention according to a fifth aspect of the present invention is the use of an anticorrosive coating composition.

A further subject matter of the present invention is finally a corrosion protection coating.

It is self-evident that particularities, features, designs, and embodiments as well as advantages or the like which in the following—for the purpose of avoiding unnecessary repetitions—are described for only one invention aspect naturally also apply to the other invention aspects without requiring express mention.

It is further self-evident that in the following specification of values, numbers, and ranges, the relevant value, number, and range specifications are not to be understood so as to be delimiting, for a person skilled in the art; it is rather self-evident that due to an individual case or application-orientation, deviations from the specified ranges or specifications are possible without exceeding the scope of the present invention.

Furthermore, as a rule, the value or parameter specifications or the like specified in the following can basically be ascertained or determined with standardized or explicitly specified determination methods or with determination methods generally familiar to a person skilled in the relevant art.

It is further self-evident that all weight- and quantity-related percent values are selected by a person skilled in the art such that their sum results in 100%.

With this proviso, the present invention shall be described in the following in more detail.

DESCRIPTION

Figure 1:
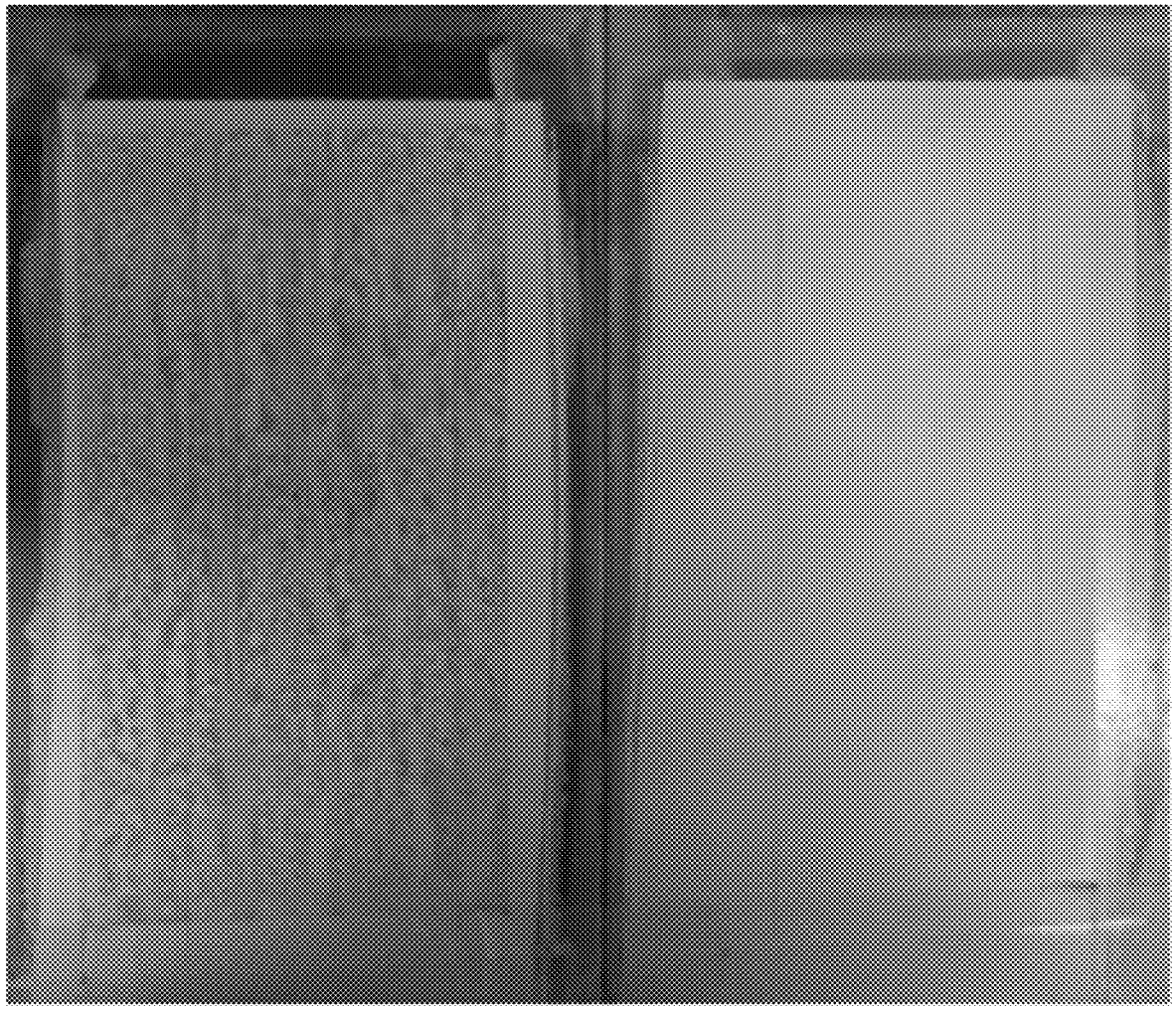
FIG. 1: provides a comparison between a zinc flake coating which contains the modified metal particles according to the invention, and a similar zinc flake coating with conventional zinc flakes in the salt spray test at the scratch according to DIN EN ISO 9227 after 24 hours.

Subject matter of the present invention are therefore—according to a first aspect of the present invention—modified metal particles, particularly for corrosion protection coatings, wherein the metal particles have an inorganically based modification on their surface.

As the applicant surprisingly discovered, the long-term stabilities of anticorrosive coating compositions in aqueous binding agent systems, in which the modified metal particles are incorporated, can be greatly improved by means of specifically modified metal particles, wherein the cathodic corrosion protective effect is not reduced, when compared to conventionally used zinc pigments.

The metal particles modified according to the invention do also not tend to oxidize in an aqueous milieu and, when incorporated in anticorrosive coating compositions, particularly zinc flake primers, have a high cathodic protective effect.

The metal particles modified according to the invention can be dispersed in an outstanding manner in aqueous systems, particularly with a hydrophilic modification and do not show the incompatibilities of metal pigments coated with stearic acid in aqueous systems.

If the modified metal particles are modified zinc flakes, the silver look of the zinc flake coating is retained under corrosion stress. For example, corrosion protection coatings which contain metal particles on the basis of zinc, modified according to the invention, show a significant reduction in white rust formation, or the formation of white rust can be complete suppressed in the salt spray test.

Due to the reduction or prevention of white rust formation in case of zinc pigments, not only the stability in aqueous coating compositions can be significantly increased but also a visually appealing metallically shiny long-lasting surface for solvent-based coatings can be retained. Conventional zinc pigments in cured coating systems—regardless of whether the coating composition was water- or solvent-based—are oxidized on the surface by forming white rust; as a result, the treated surface provided with the coating assumes a spotty and unattractive, uneven coloration. In order to at least conceal this white rust formation, open aluminum pigments are thus added in practice to the coating composition. With the modified pigments according to the invention, the metallically shiny silver-colored surface is retained for a long time even with the use of pure zinc pigments.

Corrosion protection coatings produced with the metal pigments modified according to the invention show a complete cathodic corrosion protection, i.e. even at damaged spots, such as the scratch during the salt spray test or in case of rock chips on vehicles as well as at cut edges or in uncoated areas. Corrosion protection coatings produced with the modified metal pigments according to the invention thus have a long-distance effect with regard to the cathodic protective effect of the modified metal pigments.

The modified metal pigments according to the invention expand the application spectrum of aqueous-based anticorrosive coating compositions. In particular, environmentally hazardous and organic solvents, which are problematic in terms of occupational safety, or passivating additives in the form of soluble acids and salts can be foregone or their ratio minimized.

With the modified metal pigments according to the invention, those aqueous-based coating systems are particularly accessible that do not have to be mixed shortly before their application but can already be provided ready to use by the manufacturer, thus minimizing application errors.

Within the scope of the present invention, a modification of the metal particles particularly means that the metal particles are modified with regard to the properties, particularly their surface properties such that they differ noticeably from unmodified metal particles. This applies particularly also to the oxidation sensitivity in an aqueous milieu.

Within the scope of the present invention it is usually provided that the modification is present in the form of a layer, particularly a coating. Within the scope of the present invention, the metal pigments are thus preferably provided with a layer, particularly an envelope, wherein said envelope—without committing to this theory—homogenously surrounds the metal pigments. The modification preferably forms a homogenous and closed layer which is most likely porous, and so the particles can form electrically conductive or swellable layers which allow for a cathodic protection by the pigments under corrosion stress.

Within the scope of the present invention, the modification of the metal particles in the form of a layer is usually produced particularly by means of the Stöber method or Stöber synthesis or a method based on this synthesis. With the Stöber synthesis, silicon dioxide nanoparticles are produced by adding a hydrolizable silane, particularly tetraethoxysilane, to an aqueous alcoholic solution which is adjusted to ammonia. Due to the hydrolysis of the silanes, monodisperse silicon dioxide particles are formed, wherein the particle sizes usually lie within the range from 50 to 2,000 nm.

Within the scope of the present invention, it was discovered that the Stöber synthesis is also suitable for the modification of metal pigments. For that purpose, the approach is particularly such that metal pigments in an aqueous alcoholic solution, which is adjusted to ammonia, is mixed with a hydrolyzable silane. It is thus possible to achieve a very homogenous envelope around the metal pigments, wherein the thickness of said envelope can be precisely adjusted.

The modified metal particles according to the invention, when incorporated in corrosion protection coatings, show, as described above, the same cathodic corrosion protection as unmodified metal particles, but, due to the inorganic coating, they have a significantly improved dispersibility in aqueous-based systems, and can additionally be incorporated long-term stably in aqueous systems, but particularly no unwanted gas formation to a greater extent is observable.

With regard to the layer thickness of the modification, it can naturally vary in wide ranges. However, within the scope of the present invention, good results are achieved if the modification has a layer thickness in the range from 3 to 150 nm, particularly 5 to 120 nm, preferably 8 to 100 nm, preferably 10 to 80 nm, particularly preferably 10 to 50 nm. Within the scope of the present invention, particularly good results are achieved with layer thicknesses in the range from 30 to 40 nm.

Within the scope of the present invention, good results are also achieved if the modification has a theoretical layer thickness in the range from 3 to 150 nm, particularly 10 to 100 nm, preferably 10 to 50 nm. At a known BET surface of the metal particles and at a known density of the substance, with which the metal particles are modified or coated, as well as the knowledge of the mass of the metal particles used, the theoretical layer thickness of the coating substance used can be calculated.

Tests by the applicant have shown that particularly with the use of titanium dioxide- and/or silicon dioxide-based modifications or coatings, the theoretical layer thicknesses correspond well to the actually measured layer thicknesses.

With regard to the particle size of the metal particles used within the scope of the present invention, it can also vary in wide ranges. However, particularly good results are achieved if the metal particles have particle sizes in the range from 0.1 to 30 μm, particularly 0.5 to 20 μm, preferably 1 to 15 μm.

With regard to the form or outer shape of the metal particles, plate-like and/or grain-shaped, particularly spherical metal particles are used within the scope of the present invention. Plate-like metal particles are usually also called flakes and are characterized by excellent barrier properties.

According to a particularly preferred embodiment of the present invention, the metal particles are plate-like metal particles. Plate-like metal particles, for example, are used in zinc flake coatings and have a significantly increased corrosion protection, when compared to spherical metal particles. This is probably attributable to the fact that the individual platelets in a corrosion protection coating arrange themselves in a overlapping manner, and a continuous layer of electric conductivity can thus be produced, which ensures excellent cathodic corrosion protection.

If plate-like metal particles are used within the scope of the present invention, they generally have a thickness of 50 to 1,000 nm, particularly 60 to 750 nm, preferably 80 to 600, preferably 100 to 500 nm.

In this context, it can also be provided that the plate-like metal particles have a diameter of 1 to 25 μm, particularly 2 to 20 μm, preferably 5 to 18 μm, preferably 5 to 15 μm. The above-mentioned diameters relate to the planes with the greatest expansion of the metal particles.

If grain-shaped, particularly spherical metal particles are used within the scope of the present invention, they generally have a particle diameter in the range from 500 nm to 20 μm, particularly 500 nm to 10 μm, preferably 500 nm to 5 μm.

With regard to the selection of the metal or metals for the modified metal particles, basically all known and suitable metals, which ensure good cathodic corrosion protection, can be used. However, within the scope of the present invention, it has proven to be successful if the metal particles contain and/or consist of, preferably consist of, at least one metal selected from the group of zinc, aluminum, magnesium, bismuth, tin, nickel, and manganese as well as their mixtures and alloys. Particularly good results in this context are achieved if the metal particles contain or consist of at least one metal selected from the group of zinc, aluminum, magnesium as well as their mixtures and alloys. Preferably, the metal particles used within the scope of the present invention consist of zinc, aluminum, magnesium as well as their mixtures and alloys.

According to a preferred embodiment of the present invention, the metal particles are formed on the basis of pure zinc and/or zinc alloys. In this context, particularly good results are achieved if the zinc alloys are selected from zinc bismuth alloys, zinc aluminum alloys and/or zinc aluminum magnesium alloys, particularly zinc aluminum alloys and/or zinc aluminum magnesium alloys. In this context, it has proven particularly successful if the metal particles consist of zinc aluminum magnesium alloys.

With regard to the modification of the metal particles according to the invention, the modification can be effected by a multiplicity of substances or substance mixtures. However, it has proven to be successful if the modification is purely inorganic. As a result, particularly good compatibilities can be achieved with the incorporation in aqueous systems, i.e. a stable long-term dispersion in aqueous-based anticorrosive coating compositions or varnish systems is possible without any problems. If applicable, the inorganically based coating can still contain small amounts of organic functional groups, e.g. in order to improve the incorporation in organically based systems, particularly polymer systems. However, within the scope of the present invention, a purely inorganic modification is preferred.

Within the scope of the present invention, particularly good results are achieved if the surface modification contains inorganic oxides and/or is formed from inorganic oxides. In this context, it is preferred if the surface modification is formed from inorganic oxides.

As described above, any suitable substance, but particularly any suitable oxide, can be taken into consideration for the modification. However, it is a fact that good results are obtained if the modification is formed by inorganic oxides, particularly oxides of silicon, titanium and/or zirconium. Particularly good results are obtained if the modification is formed by silicon dioxide and/or titanium oxide, preferably silicon dioxide. A particularly good cathodic corrosion protection is ensured particularly on the basis of systems which contain silicon dioxide, wherein the corrosion of the metal particles in an aqueous milieu is either completely suppressed or takes place only to an insignificant extent.

Within the scope of the present invention particularly good results are achieved if the modification is generated on the metal particles by means of precipitation reaction and/or condensation reaction, preferably by means of condensation reaction. As a result, a particularly sound bond of the inorganic modification with the metal particles is achieved which is stable to the extent that the metal particles in an aqueous milieu are not affected and corroded, but anticorrosive coating compositions, which contain the modified metal particles, show the highest cathodic corrosion protection.

A further subject matter of the present invention-according to a second aspect of the present invention—is the use of the previously described metal particles for producing corrosion protection coatings and anticorrosive coating compositions.

For further details regarding the use according to the invention, reference can be made to the above descriptions with regard to the metal particles according to the invention which correspondingly apply to the use according to the invention.

A further subject matter of the present invention-according to a third aspect of the present invention—is a method for producing modified metal particles, wherein
(a) in a first method step, metal particles are dispersed in an aqueous-based dispersion medium, and
(b) in a subsequent second method step, the metal particles dispersed in method step (a) are coated with an inorganically based layer, particularly a coating.

Within the scope of the present invention, particularly an inorganically based envelope is built around the metal particles in order to ensure a better dispersibility of the modified metal particles in aqueous systems and to prevent the corrosion of the metal particles in an aqueous milieu.

Due to the method according to the invention, a stable long-term dispersibility of the metal particles is made possible but the suitability of the metal particles for cathodic corrosion protection is not affected, and so they cannot only be used similarly to conventional corrosion protection pigments but rather also have an expanded field of application, particularly in aqueous systems. Furthermore, the pigments produced by the method according to the invention are also suitable for the incorporation in solvent-based coating systems because they have significantly improved corrosion resistances, particularly against white rust, and a corresponding look of the coating is retained for a long time.

Within the scope of the present invention, the inorganically based layer with a layer thickness in the range from 3 to 150 nm, particularly 5 to 120 nm, preferably 8 to 100 nm, preferably 10 to 80 nm, particularly preferably 10 to 50 nm, is precipitated onto the metal particles.

Within the scope of the present invention, it is furthermore preferred if the inorganically based layer contains organic oxides and/or is formed from such organic oxides. In this context, it is preferred if the inorganically based layer is formed from organic oxides.

With regard to the chemical nature of the inorganic oxides, any suitable inorganic oxide—as previously described—can be used. However, within the scope of the present invention, particularly good results are achieved if the inorganically based layer is formed by oxides of silicon, titanium and/or zirconium, preferably by silicon dioxide and/or titanium dioxide, preferably by silicon dioxide. Particularly the use of silicone dioxide for the inorganically based layer results in a particularly high protection of the metal particles against corrosion in an aqueous milieu.

According to a particular embodiment of the present invention, it can be provided that the inorganically based layer is organically modified. In this context, it can be particularly provided that the inorganically based layer is modified with alkyl, aryl, amine and/or epoxy groups and/or with aromatic groups, such as phenoxy groups. However, within the scope of the present invention, it is usually provided that the inorganically based layer is purely inorganic.

According to a preferred embodiment of the present invention, in method step (b), the inorganically based layer is precipitated onto the metal particles by means of a chemical reaction, particularly by means of precipitation reaction and/or condensation reaction, preferably by means of condensation reaction.

In case of precipitation reactions, substances are precipitated from solutions or dispersions as solid material by exceeding the solubility product. In case of condensation reactions, individual molecules are combined with one another by means of dehydration, and so three-dimensional networks are formed which subsequently results in a precipitation of the substance or the formation of solid bodies. For example, condensation reactions can be induced in inorganic compounds, such as silicates, frequently by a pH-value change. These are precipitation reactions due to condensation.

A relatively slow and even precipitation of the solid material onto the metal particles is ensured particularly by means of condensation reaction, wherein individual agglomerates are also formed in the solutions, said agglomerates subsequently accumulating on the surface of the metal particles.

Within the scope of the present invention, it is usually provided that in method step (b), the dispersion containing the metal particles is mixed with at least one modification reagent. Within the scope of the present invention, it is particularly preferred if the modification reagent is particularly a precursor. Precursors are transferred to the corresponding end-products by means of a chemical reaction, possibly by means of a plurality of intermediate stages.

Within the scope of the present invention, it is preferred if the modification reagent is precipitated onto the metal particles after and/or during a chemical reaction.

Within the scope of the present invention, particularly good results are obtained if the modification reagent is selected from silanes, titanates, and zirconates as well as their mixtures, particularly silanes and titanates and their mixtures, particularly silanes. With silanes, titanates, and zirconates as well as their mixtures, particularly stable and durable inorganic layers can be produced on the metal particles which can form a stable connection by means of condensation reactions with the hydroxy functions of the oxides or hydroxides present on the surface of the metals.

If a silane is used as modification agent within the scope of the present invention, it has proven to be successful if the silane is selected from the silanes of the general formula I

$$R_{4-n}SiX_n \quad (I)$$

with
R=alkyl, particularly $C_1$- to $C_5$-alkyl, preferably $C_1$- to $C_3$-alkyl, preferably $C_1$- and/or $C_2$-alkyl;
aryl, particularly $C_6$- to $C_{20}$-aryl, preferably $C_6$- to $C_{15}$-aryl, preferably $C_6$- to $C_{10}$-aryl;
olefin, particularly terminal olefin, preferably $C_2$- to $C_{10}$-olefin, preferably $C_2$- to $C_8$-olefin, particularly preferably $C_2$- to $C_5$-olefin, very particularly preferably $C_2$- and/or $C_3$-olefin, particularly preferably vinyl,
amine, particularly $C_2$- to $C_{10}$-amine, preferably $C_2$- to $C_8$-amine, preferably $C_2$- to $C_5$-amine, particularly preferably $C_2$- and/or $C_3$-amine;
carboxylic acid, particularly $C_2$- to $C_{10}$-carboxylic acid, preferably $C_2$- to $C_8$-carboxylic acid, preferably $C_2$- to $C_5$-carboxylic acid, particularly preferably $C_2$- and/or $C_3$-carboxylic acid;
alcohol, particularly $C_2$- to $C_{10}$-alcohol, preferably $C_2$- to $C_8$-alcohol, preferably $C_2$- to $C_5$-alcohol, particularly preferably $C_2$- and/or $C_3$-alcohol;
X=halogen, particularly chlorine and/or bromine;
alkoxy, particularly $C_1$- to $C_6$-alkoxy, particularly preferably $C_1$- to $C_4$-alkoxy, very particularly preferably $C_1$- and/or $C_2$-alkoxy; and
n=0 to 4, particularly 0 to 2, preferably 0 or 1.

Within the scope of the present invention, silanes which have non-hydrolyzable organic groups can thus also be used. However, silanes with non-hydrolyzable groups—if at all—are used only in small quantities in order to increase, e.g. the compatibility with organic binding agent systems. However, within the scope of the present invention, preferably no silanes with non-hydrolyzable groups are used.

According to a preferred embodiment of the present invention, the modification reagent is a tetraalkoxysilane. In this context, particularly good results are achieved if the silane is selected from tetra($C_1$- to $C_6$-alkoxy)silanes, particularly tetra($C_1$- to $C_4$-alkoxy)silanes, preferably tetra($C_1$- and $C_2$-alkoxy)silanes.

Within the scope of the present invention, it is particularly preferred if the modification reagent is tetraethoxysilane.

As described above, within the scope of the present invention, an aqueous-based dispersion medium is used. In this context, particularly good results are achieved if the dispersion medium used in method step (a) is water or a mixture of water and organic solvents, particularly a mixture of water and organic solvents.

Within the scope of the present invention, a dispersion is a multi-phase system, in which one or more substances, the so-called disperse phase, are present finely distributed in a further phase, the continuous phase, also called the dispersion medium.

If an organic solvent, possibly in combination with water, is used as dispersion medium within the scope of the method according to the invention, the organic solvent is usually selected from the group of alcohols, ethers, carboxylic acid esters, ketones, amides, and their mixtures.

In this context, it can be particularly provided that the organic solvent is selected from $C_1$- to $C_6$ alcohols, diethyl ether, glycol ethers, acetic acid ethyl ester, acetone, N,N-dimethylformamide, and their mixtures.

Within the scope of the present invention, particularly good results are achieved if the organic solvent is selected from methanol, ethanol, 1-propanol, 2-propanol, butanol, and their mixtures. It is particularly preferred if the organic solvent is selected from methanol, ethanol, 2-propanol, and their mixtures. The best results within the scope of the present invention are achieved if the organic solvent is ethanol.

If mixtures of water and an organic solvent are used within the scope of the present invention, it has proven to be successful if the dispersion medium has a weight-related ratio of organic solvent to water in the range of 1:5 to 10:1, particularly 1:2 to 6:1, preferably 1:1 to 5:1, preferably 2:1 to 4:1, particularly preferably 2.5:1 to 3.5:1. With ratios of organic solvent to water in the above ratios, particularly the hydrolysis of the inorganic modification reagents, such as silanes, can be specifically controlled, and so coatings with the desired properties can be produced on the metal particles.

Within the scope of the present invention, a weight-related ratio of dispersion medium to metal particles in the range from 1:1 to 20:1, particularly 5:1 to 15:1, preferably 7:1 to 12:1, preferably 9:1 to 10:1 is usually adjusted in method step (a). With the weight-related ratios of dispersion medium to metal particles in the above ranges, it is possible to achieve an even dispersion of the metal particles and a good mixing with the modification reagent, and so the particles can overall be coated evenly.

Within the scope of the present invention, it can be provided that the dispersion produced in method step (a) contains the dispersion medium in quantities of 40 to 99% w/w, particularly 50 to 98% w/w, preferably 70 to 95% w/w, preferably 80 to 95% w/w relative to the dispersion.

It can also be provided that the dispersion produced in method step (a) contains the metal particles in quantities of 1 to 60% w/w, particularly 2 to 50% w/w, preferably 5 to 30% w/w, preferably 5 to 15% w/w relative to the dispersion.

With regard to the pH-value of the dispersion produced in method step (a), it can also vary in wide ranges. However, it has proven to be successful if the pH-value of the dispersion is adjusted in method step (a) to values in the range from 7 to 10, particularly 8 to 9.

If the pH-value is adjusted in method step (a) to specific values, this is usually effected by adding a base, particularly by adding an aqueous solution of a base. Within the scope of the present invention, it is particularly preferred if the pH-value is adjusted by adding caustic soda, potash, aqueous ammonia solution, or their mixtures, wherein the adjustment of the pH-value by adding an aqueous ammonia solution is particularly preferred because no additional ions, particularly cations are introduced in the dispersion which could interfere with the subsequent precipitation of the modification.

With regard to the temperature range, in which method step (a) is executed, it can also vary in wide ranges. However, it has proven to be successful if method step (a) is executed at temperatures in the range from 10 to 50° C., particularly 15 to 40° C., preferably 20 to 30° C.

As previously described, in method step (b), the dispersion produced in method step (a) is mixed with a modification reagent. With regard to the quantity of the modification agent, which is added in method step (b) to the dispersion from method step (a), it can also be varied in wide ranges, depending on the layer thickness of the modification to be obtained. However, it has proven to be successful if a weight-related ratio of modification reagent to metal particles is adjusted in method step (b) in the range from 1:10 to 10:1, particularly 1:8 to 7:1, preferably 1:5 to 5:1, preferably 1:4 to 4:1. If the modification reagent is used at the above ratios, layer thicknesses of the modification particularly in the range from 5 to 50 nm can be achieved.

Within the scope of the present invention, it is furthermore provided that, according to a preferred embodiment, a weight-related ratio of modification reagent to metal particles is adjusted in method step (b) in the range from 1:1 to 1:4, particularly 1:2 to 1:3. With the above ratios, coatings particularly with a layer thickness of approximately 0.05 μm can be produced.

Within the scope of the present invention, it can further be provided that after the addition of the modification agent in method step (b), the dispersion contains the dispersion medium in quantities of 40 to 98% w/w, particularly 50 to 96% w/w, preferably 70 to 95% w/w, particularly preferably 85 to 95% w/w relative to the dispersion.

It can further be provided that in method step (b), the dispersion contains metal particles in quantities of 1 to 50% w/w, particularly 2 to 40% w/w, preferably 3 to 20% w/w, particularly preferably 5 to 10% w/w relative to the dispersion.

It can also be provided that in method step (b), the dispersion contains the modification agent in quantities from 1 to 40% w/w, particularly 2 to 25% w/w, preferably 2 to 5% w/w relative to the dispersion.

With regard to the temperature, at which method step (b) is executed, it has proven to be successful if method step (b) is executed at temperatures in the range from 10 to 50° C., particularly 15 to 40° C., preferably 20 to 30° C. Within the above temperature ranges, the growth kinetics of the coating can be controlled such that particularly stable coatings can be achieved which, however, ensure electric conductivity and thus cathodic corrosion protection, when the coated metal particles are incorporated in varnish systems.

As previously already described, the modification of the metal pigments within the scope of the present invention can be achieved particularly by means of a Stöber synthesis or a method based on this synthesis.

Within the scope of the present invention, it is usually provided that in a method step (c), which follows method step (b), the dispersion medium is removed, particularly by decanting or filtering.

Within the scope of the present invention, it can further be provided that in method step (c), the metal particles are dried after the removal of the dispersion medium, particularly at temperatures in the range from 50 to 150° C., particularly 60 to 120° C., preferably 70 to 100° C., preferably 75 to 90° C. A drying of the metal particles at the above temperature range allows for an additionally improved bonding of the modification with the surface of the metal particles.

However, with the classic Stöber synthesis, the nanoparticles obtained are not dried but further processed by means of the solvent to a state wetted with the dispersion medium, particularly, they also incorporated in coating systems in order to prevent an unwanted agglomerating of the particles.

Within the scope of the present invention, it is additionally preferred if the metal particles are dried until their water content lies between 0.01 to 2% w/w, particularly 0.1 to 1.5% w/w, particularly 0.2 to 1% w/w, preferably 0.5 to 0.9% w/w relative to the coated metal particles.

For further details regarding the method according to the invention, reference can be made to the above descriptions of the other invention aspects which, with regard to the method according to the invention, apply correspondingly.

A further subject matter of the present invention—according to a fourth aspect of the present invention—is an anticorrosive coating composition which contains the modified metal particles described above.

Within the scope of the present invention, particularly good results are achieved if the coating composition contains the metal particles in quantities of 20 to 80% w/w, preferably 30 to 70% w/w, preferably 40 to 60% w/w.

Within the scope of the present invention, it is usually further provided that the coating composition contains a binding agent. If the coating composition contains a binding agent, the coating composition usually contains the binding agent in quantities of 5 to 60% w/w, preferably 6 to 40% w/w, preferably 7 to 20% w/w, particularly preferably 8 to 15% w/w relative to the coating composition.

With regard to the binding agent used within the scope of the present invention for the anticorrosive coating composition, a broad selection of binding agents can be used. However, it has proven to be successful if the binding agent is selected from the group of silanes, silanols, silane hydrolysates, polysiloxanes, silicates, titanates, zirconates, polyurethanes, polyacrylates, polyethers, polyesters, and their mixtures. Particularly good results are achieved if inorganically based binding agents are used. Within the scope of the present invention, it is thus preferred if the binding agent is selected from the group of silanes, silanols, silane hydrolysates, polysiloxanes, silicates, titanates, and their mixtures.

The silicates used preferably within the scope of the present invention are sodium silicate and potassium silicate which are used particularly in the form of their aqueous solutions, the so-called water glasses—sodium water glass and potassium water glass.

According to a preferred embodiment of the present invention, the silanes used for the anticorrosive coating composition according to the invention are selected such that they have non-hydrolyzable organic groups. The non-hydrolyzable organic groups are particularly selected from alkyl, vinyl, and aryl groups, wherein an additional functionalization of the groups with amines or epoxides is possible. In particular, the silanes listed in connection with the coating of the metal particles according to the invention can be used for the binding agent of the anticorrosive coating composition.

Polysiloxanes preferably used have alkyl and/or aryl groups, wherein methyl groups, phenyl groups, and methylphenyl groups are particularly preferred.

Typical titanium or zirconium alkoxy compounds are used as titanates and zirconates, for example tetra-n-butyltitanate, tetraisopropyl titanate, or vinyltri-n-butyltitanate.

Within the scope of the present invention, it is usually provided that the anticorrosive coating composition has a dispersion medium, particularly an aqueous-based dispersion medium.

In general, the anticorrosive coating composition contains the dispersion medium in quantities of 10 to 70% w/w, particularly 20 to 60% w/w, preferably 25 to 50% w/w, preferably 30 to 40% w/w, relative to the anticorrosive coating composition.

Within the scope of the present invention, an aqueous-based dispersion medium is preferably used for the anticorrosive coating composition. Particularly good results in this context are achieved if the anticorrosive coating composition, in addition to water, also contains small quantities of organic solvents as dispersion medium.

Particularly good results in this context are achieved if the anticorrosive coating composition has a weight-related ratio of water to organic solvent in the range from 1:1 to 20:1, particularly 2:1 to 15:1, preferably 3-1 to 10:1, preferably 4:1 to 6:1.

If an organic solvent is used within the scope of the present invention as dispersion medium of the anticorrosive coating composition, possibly in combination with water, the organic solvent is usually selected from the group of alcohols, ethers, carboxylic acid esters, ketones, amides, aliphatic nitro compounds, and their mixtures.

Within the scope of the present invention, it can further be provided that the coating composition contains at least one additive. If the coating composition contains an additive, the coating composition usually contains the additive in quantities of 0.1 to 10% w/w, particularly 1 to 6% w/w, preferably 3 to 5% w/w, relative to the coating composition.

All compounds and compound mixture which can influence the properties of the coating composition in the desired manner are taken into consideration as additives.

However, the additive is usually selected from wetting agents, dispersing agents, defoamers, thickeners, rheology suspending agents, stabilizers, pH-suspending agents, bulking agents, corrosion protection additives, and their mixtures.

For example, cationic, anionic, and nonionic wetting or dispersing agents are used as wetting agent or dispersing agent. Commonly used wetting and dispersing agents are, e.g. ethoxylated alcohols, such as alkylphenol ethoxylates or ethoxylated fatty acids. Alkyl ether sulfonates, alkyl sulfosuccinate, and dialkyl sulfosuccinate, such as sodium dioctyl sulfosuccinate, are, e.g. used as wetting agent.

If the anticorrosive coating composition contains a defoamer, this defoamer is usually selected from mineral oil defoamers or silicon defoamers, such as polyethersiloxanes.

For adjusting the viscosity, thickeners can be added to the coating composition, which are usually selected from cellulose derivatives, such as hydroxyethyl cellulose, methyl cellulose, methyl ethyl cellulose, methyl hydroxypropyl cellulose, ethyl hydroxyethyl cellulose, or sugar derivatives, such as xanthan. However, sheet silicates or pyrogenic silicic acid as well as polyurethane compounds can additionally also be used as thickener.

In addition, the coating composition can have further additives, particularly corrosion protection additives. Conventional corrosion protection additives are, e.g. phosphoric acids, phosphonic acids, or their salts as well as citrates, ascorbates, or molybdates. Additionally, organic nitrates, such as aliphatic nitrates or mono- or oligo-nitrates of the benzoic or salicylic acid can, e.g. be used as corrosion protection additive.

If the anticorrosive coating composition contains a stabilizer, the stabilizer is usually selected from complex anions or cations of the transition metals. Polyoxometalates, such as polyvanadates are particularly suitable stabilizers. In addition, molybdates, such as ammonium molybdate, or wolframates, such a potassium wolframate, or potassium permanganate are suitable as stabilizers.

For further detail about this invention aspect, reference can be made to the above descriptions of the other invention aspects which, with regard to the anticorrosive coating composition according to the invention, apply correspondingly.

A further subject matter of the present invention—according to a fifth aspect of the present invention—is the use of the previously described anticorrosive coating composition for producing a corrosion protection coating.

For producing the corrosion protection coating, the anticorrosive coating composition is applied to a substrate with a layer thickness of usually 2 to 20, particularly 3 to 15, preferably 5 to 10 μm. The substrate is usually a metallic substrate, particularly a ferrous substrate, preferably a steel-containing substrate or a substrate consisting of steel.

The anticorrosive coating composition can be applied with any suitable method. However, usually, the coating composition is applied by immersion, dip spinning, doctor blading, spraying, coil-coating, or spreading.

After application of the coating composition to the substrate, the coating composition is usually subjected to a thermal treatment in the range from 50 to 300° C., particularly 70 to 250° C., particularly 100 to 200° C. in order to ensure complete curing and crosslinking of the coating composition.

For further details regarding the use of an anticorrosive coating composition according to the invention, reference can be made to the above descriptions of the other invention aspects which, with regard to the use according to the invention, apply correspondingly.

A further final subject matter of the present invention—according to a sixth aspect of the present invention—is a corrosion protection coating which is available from the previously described anticorrosive coating composition.

For further details regarding the corrosion protection coating according to the invention, reference can be made to the above descriptions of the invention aspects which, with regard to the corrosion protection coatings, apply correspondingly.

In the following, the subject matter of the present invention shall be illustrated in a non-delimiting manner using the embodiments.

Embodiments

In the following test, the production of modified metal particles according to the invention as well as their use in anticorrosive coating compositions shall be described using a preferred embodiment, namely said modified zinc flakes;

1. Production of Modified Zinc Particles

For the production of metal particles modified according to the invention, commercially available zinc flakes, which are coated with stearic acid, are degreased and subsequently dried for the preparation for further treatment.

The zinc flakes have a specific surface of 1 $m^2/g$.

For coating the zinc flakes, a dispersion with the composition shown in table 1 is produced.

TABLE 1

Dispersion for producing modified metal pigments

| Component | Parts by weight |
|---|---|
| Ethanol | 79.0 |
| Water | 27.0 |
| Ammonia solution (25%) | 2.5 |
| Zinc flakes | 10.0 |
| Tetraethoxysilane | 3.5 |
| Total | 122.0 |

For producing the above dispersion, ethanol, water, and ammonia solution are provided and mixed with the zinc flakes by stirring at room temperature. This results in a dispersion which is subsequently mixed with the tetraethoxysilane at room temperature. After adding the tetraethoxysilane, the dispersion is stirred for 2 hours at room temperature, and the dispersion medium mixture is subsequently separated through filtration. The isolated zinc flakes are dried in the oven at 80° C. until they have a water content of 0.8% w/w. The modified zinc flakes have s silicon dioxide layer with an average thickness of approximately 0.05 μm.

2. Gassing Test

For the following gassing test, the hydrogen development of zinc flakes modified according to the invention is compared to the zinc flakes coated with stearic acid in an aqueous milieu. For that purpose, a weighed portion of approximately 3 g of zinc flakes are doused with 40 g of water in an Erlenmeyer flask, and the mixture is subsequently stirred at approximately 34° C. The resulting gas is collected and monitored every 24 hours.

TABLE 2

Results of the gassing test

| Sample | Weighed portion metal [g] | Gas quantity [ml] | | | | | | | Total quantity |
|---|---|---|---|---|---|---|---|---|---|
| | | 24 h | 48 h | 72 h | 96 h | 120 h | 144 h | 168 h | |
| Zinc flake (coated with stearic acid; comparison) | 3.00 | 33.42 | 2.36 | 19.96 | 13.48 | 25.00 | 35.82 | 32.91 | 162.95 |
| Zinc flake (coated with stearic acid; comparison) | 2.98 | 34.39 | 2.72 | 10.73 | 10.91 | 9.30 | 21.24 | 10.97 | 100.26 |
| Zinc flake (coated with $SiO_2$; according to the invention) | 3.00 | 7.31 | 0 | 7.79 | 6.10 | 6.84 | 7.13 | 5.35 | 40.52 |
| Zinc flake (coated with $SiO_2$; according to the invention) | 2.99 | 8.10 | 0 | 8.50 | 7.39 | 7.70 | 7.34 | 5.69 | 44.72 |

It becomes apparent that the zinc flakes provided with a $SiO_2$ layer according to the invention show a significantly lower hydrogen development than the zinc flakes coated with stearic acid.

Furthermore, the zinc flakes modified with $SiO_2$ according to the invention disperse significantly easier in an aqueous medium than the zinc flakes coated with stearic acid; in particular, the zinc flakes modified according to the invention can simply be stirred in water with a blade agitator while maintaining the silver dispersion.

3. Use of the Modified Metal Particles in Coatings

The zinc flakes modified according to the invention are tested both in aqueous coating compositions and solvent-based coating compositions.

3.1 Aqueous Systems

The following coating composition shown in table 3, which contains water as dispersion medium, is produced with zinc flakes modified according to the invention, and with standard zinc flakes which are coated with stearic acid.

TABLE 3

Anticorrosive coating composition

| Component | Function | Portion [% w/w] |
|---|---|---|
| Dipropylene glycol | Dispersion medium | 5.3 |
| Isotridecanol, ethoxylated | Dispersion medium | 4.0 |
| 1-nitropropane | Dispersion medium | 0.75 |
| Water | Dispersion medium | 29.64 |
| Epoxy silane oligomer | Binding agent | 10.0 |
| Sodium silicate | Binding agent | 0.1 |
| Zinc flake | Metal particle | 45.10 |
| Orthophosphoric acid | Corrosion protection additive | 0.50 |
| Sodium dioctyl sulfosuccinate | Wetting agent | 0.50 |
| Polyethersiloxane copolymer | Defoamer | 0.50 |
| Xanthan gum | Thickener | 3.55 |

The coating composition containing the metal particles modified according to the invention as well as the coating composition containing the zinc flakes are applied to steel sheets by means of a doctor blade and subsequently cured, thus resulting in coatings with a layer thickness from 6 to 9 μm.

The steel sheets are subsequently subjected to a salt spray test at the scratch according to DIN EN ISO 9227.

After 24 hours and after 7 days, each of the metal sheets coated with the coating composition according to the invention and the comparative coating composition are evaluated and compared. The results are shown in FIGS. 1 and 2.

FIG. 1 shows a comparison between the steel sheet coated with the coating composition according to the invention on the right side and a steel sheet coated with the comparative coating composition on the left side after 24 hours in the salt spray test. While the steel sheet coated with the corrosion protection coating according to the invention shows no signs of red or white rust, the comparative coating already shows first signs of white rust which manifests itself as large spots on the coating. However, red rust is also not found on the steel sheet coated with the comparative coating.

Figure 2:
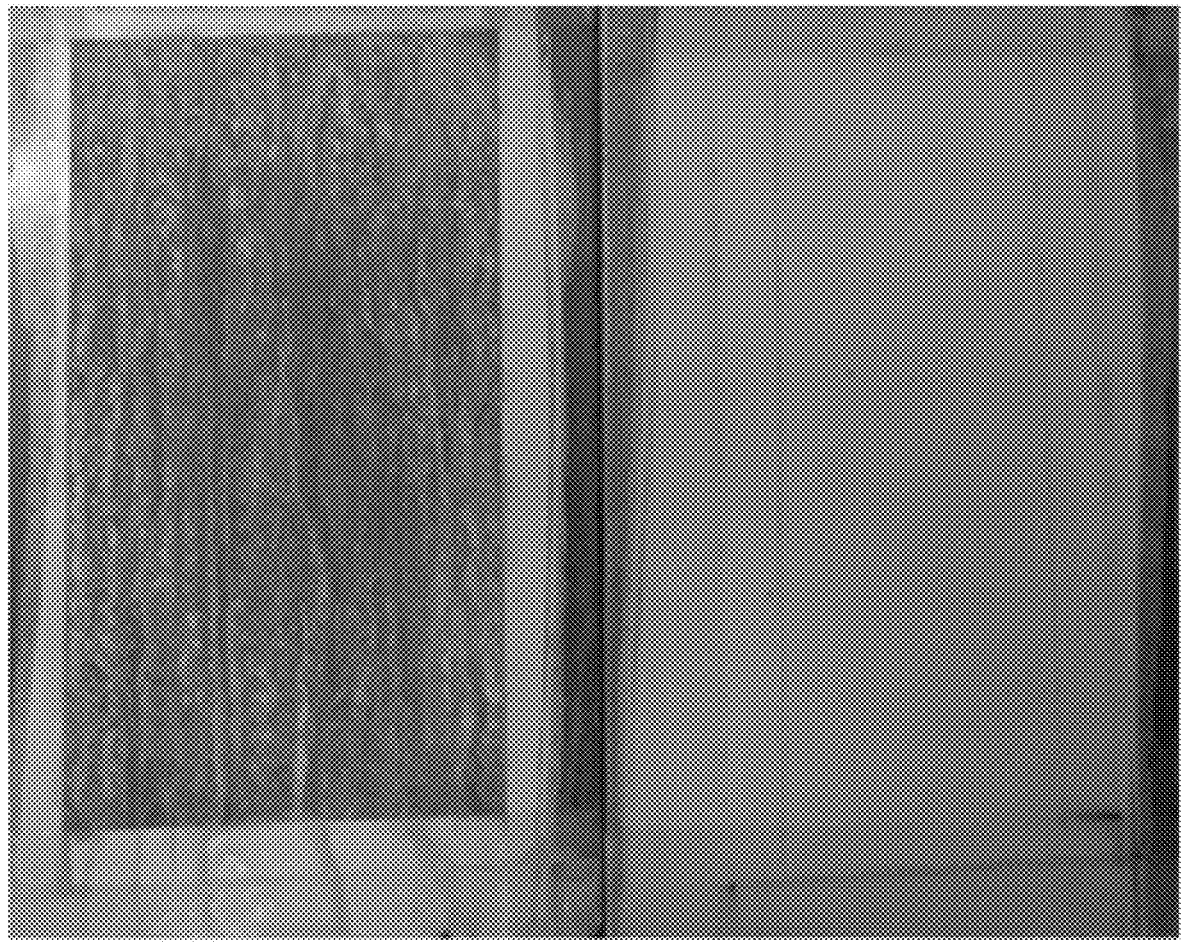
FIG. 2: provides a comparison between a zinc flake coating with the metal particles modified according to the invention, and a zinc flake coating with conventional zinc flakes in the salt spray test at the scratch according to DIN EN ISO 9227 after seven days.

FIG. 2 shows on the right side the steel sheet coated with the corrosion protection coating according to the invention after 7 days in the salt spray test, while the left steel sheet is provided with the comparative coating. While the substrate provided with the coating composition according to the invention shows no signs of red rust or white rust, the substrate coated with the comparative composition is already noticeably affected and shows a distinct white rust development on the coating, but wherein no red rust can be detected on the steel sheet.

It is apparent that the white rust resistance of the zinc flakes in aqueous-based coating systems can be significantly improved with the modification of the cell flakes according to the invention; in particular, after 7 days in the salt spray test, the tested coatings still exhibit a visually pleasing metal color, while the coating with the conventional zinc flakes is already tarnished dark grey and spotty and shows distinct white rust developments. As can also be seen from the examples, the better corrosion resistance of the zinc flakes against white rust is not substituted by a loss of the cathodic corrosion protection because the substrate coated with the coating composition according to the invention shows no red rust at all at the scratch.

3.2 Solvent-Based Systems

The solvent-containing coating compositions are applied to a degreased steel sheet by immersion and cured at 200° C. for 30 minutes in the oven. The result are coatings with layer thicknesses of 10 μm.

The examples indicated with a relate to conventional zinc pigments (comparison), and the examples indicated with b relate to pigments coated according to the invention by means of the Stöber synthesis (according to the invention), wherein the envelope has a layer thickness of approximately 30 nm.

The white rust resistance and the red rust resistance in the neutral salt spray test were evaluated as follows:

(a) Red Rust Resistance:
+++ after more than 1000 hours in the salt spray test, the substrate shows no signs of red rust both on the surface and at the scratch
++ the substrate shows a slight rust formation at the scratch
+ a more distinct red rust formation at the scratch and a first red rust formation on the surface
+/− distinct red rust formation at the scratch and slight red rust formation on the surface
− distinct red rust formation on both the surface and at the scratch (b) White Rust Resistance:
+++ after more than 1000 hours in the neutral salt spray test, the coating shows no signs of white rust
++ slight white rust formation of the coating noticeable due to spotty discoloration
x increased white rust formation in the coating
+/− distinct extensive white rust formation in the coating
− strong and continuous white rust formation The tests conducted show that the best results can be achieved with zinc aluminum flakes modified according to the invention, wherein pure zinc flakes and zinc dust also show a significantly improved white rust resistance, when compared to unmodified zinc particles. Surprisingly, it has become apparent for all zinc particles modified according to the invention that the red rust resistance of the coating is also significantly improved, when compared to coatings with unmodified zinc particles. Due to the use of the pigments, modified according to the invention, in corrosion protection coatings, not only the white rust resistance of the coatings is significantly increased but also the red rust resistance of the substrate.

TABLE 4

Comparison of solvent-based coatings with zinc flakes

| Component | Example 1a (comparison) Quantity [g] | Example 1b (according to the invention) Quantity [g] |
|---|---|---|
| Titanate (Tyzor TOT/Dorf Ketal) | 465 | 465 |
| Titanate (Tyzor BTP/Dorf Ketal) | 110 | 110 |
| Bisphenol A-ethylene-oxide-diol (MACOL 98B/BASF) | 155 | 155 |
| Rheology additive (BYK 410/BYK) | 50 | 50 |
| Zinc flake (Stapa Zn 8/Eckart) | 9100 | 9150 |
| Ethyl cellulose N-200 (Hercules Co.) | 120 | 120 |
| Solvent mixture (24% benzyl alcohol, 23% toluol, 24% methyl isobuthyl ketone 24% Solvesso 100 5% n-butanol) | 1200 | 1200 |
| Red rust resistance in neutral SST >1000 h Evaluation on 0.5 mm scratch at 10 μm layer thickness | + | ++ |
| White rust resistance on the surface at 10 μm layer thickness | +/− | +++ |

TABLE 5

Comparison of solvent-based coatings with zinc flakes

| Component | Example 2a (comparison) Quantity [g] | Example 2b (according to the invention) Quantity [g] |
|---|---|---|
| Titanate (Tyzor TOT/Dorf Ketal) | 60 | 60 |
| Bisphenol A-ethylene-oxide-diol (MACOL 98B/BASF) | 3 | 3 |
| Rheology additive (BYK 410/BYK) | — | — |
| Zinc flake (Stapa Zn 8/Eckart) | 180 | 180 |
| Ethyl cellulose N-200 (Hercules Co.) | 2.5 | 2.5 |
| Solvent mixture (24% benzyl alcohol, 23% toluol, 24% methyl isobuthyl ketone 24% Solvesso 100 5% n-butanol) | 85 | 85 |
| Red rust resistance in neutral SST >1000 h Evaluation on 0.5 mm scratch at 10 μm layer thickness | + | ++ |
| White rust resistance on the surface at 10 μm layer thickness | +/− | +++ |

TABLE 6

Comparison of solvent-based coatings with zinc aluminum pigments

| Component | Example 3a (comparison) Quantity [g] | Example 3b (according to the invention) Quantity [g] |
|---|---|---|
| Titanate (Tyzor TOT/Dorf Ketal) | 65 | 65 |
| Bisphenol A-ethylene-oxide-diol (MACOL 98B/BASF) | 3 | 3 |
| Rheology additive (M-P-A 4020 X/Elementis Specialties) | 2 | 2 |
| Zinc aluminum flake (Stapa 4ZnAl7/Eckart) | 150 | 152 |
| Ethyl cellulose N-200 (Hercules Co.) | 2 | 2 |
| Solvent mixture (24% benzyl alcohol, 23% toluol, 24% methyl isobuthyl ketone 24% Solvesso 100 5% n-butanol) | 70 | 70 |
| Red rust resistance in neutral SST >1000 h Evaluation on 0.5 mm scratch at 10 μm layer thickness | + | ++ |
| White rust resistance on the surface at 10 μm layer thickness | + | +++ |

TABLE 7

Comparison of solvent-based coatings with zinc dust

| Component | Example 4a (comparison) Quantity [g] | Example 4b (according to the invention) Quantity [g] |
|---|---|---|
| Titanate (Tyzor TOT/Dorf Ketal) | 65 | 65 |
| Bisphenol A-ethylene-oxide-diol (MACOL 98B/BASF) | 3 | 3 |
| Rheology additive (M-P-A 4020 X/Elementis Specialties) | 2 | 2 |
| Zinc dust (Superfinde 620/Conmet) | 170 | 175 |
| Ethyl cellulose N-200 (Hercules Co.) | 2 | 2 |
| Solvent mixture (24% benzyl alcohol, 23% toluol, 24% methyl isobuthyl ketone 24% Solvesso 100 5% n-butanol) | 70 | 70 |
| Red rust resistance in neutral SST >1000 h Evaluation on 0.5 mm scratch at 10 μm layer thickness | +/− | + |
| White rust resistance on the surface at 10 μm layer thickness | − | ++ |

The invention claimed is:

1. An anti-corrosive coating composition containing metal particles in quantities of 30 to 70 w/w, relative to the coating composition and an inorganic binding agent,
   wherein the inorganic binding agent is selected from the group consisting of a silane, a silanol, a silane hydrolysate, a polysiloxane, a silicate, a titanate, and mixtures thereof,
   wherein the metal particles include at least one metal selected from the group consisting of zinc, aluminum, magnesium, alloys thereof and mixtures thereof;
   wherein the metal particles have an inorganically based surface modification in the form of a coating layer and are capable of imparting cathodic corrosion protection;
   wherein the inorganically-based surface modification is limited to a coating layer formed by an oxide selected from the group consisting of silicon dioxide, a titanium oxide and mixtures thereof,
   wherein the inorganic-based surface modification has a layer thickness in the range of 3-150 nm, and
   wherein the coating composition applied to a metal substrate provides cathodic corrosion protection to the metal substrate.

2. The anti-corrosive composition according to claim 1, wherein the coating composition contains the surface-modified metal particles in quantities of 40 to 60 w/w, relative to the coating composition.

3. The anti-corrosive composition according to claim 2, wherein the metal particles have particle sizes in the range of 0.1 μm to 30 μm and wherein the metal particles are platelet-shaped or granular.

4. The anti-corrosive coating composition according to claim 3, wherein the metal particles are formed based on pure zinc or zinc alloys.

5. A method for forming a corrosion protection coating composition comprising applying the coating of claim 4 to a surface.

6. An anti-corrosion coating formed by the application of the coating composition of claim 2 to a surface.

7. The anti-corrosive composition according to claim 1, wherein the metal particles have particle sizes in the range of 0.1 μm to 30 μm and wherein the metal particles are platelet-shaped or granular.

8. The anti-corrosive coating composition according to claim 7, wherein the metal particles are formed based on pure zinc or zinc alloys.

9. The anti-corrosive coating composition according to claim 1, wherein the metal particles are formed based on pure zinc or zinc alloys.

10. A method for forming a corrosion protection coating composition comprising applying the coating of claim 1 to a surface.

11. An anti-corrosion coating formed by the application of the coating composition of claim 1 to a surface.

12. A method for forming a coating layer comprising applying a ready to use coating composition to a surface;
    wherein the ready to use coating composition includes an inorganic binding agent and metal particles in quantities of 30 to 70 w/w, relative to the coating composition;
    wherein the inorganic binding agent is selected from the group consisting of a silane, a silanol, a silane hydrolysate, a polysiloxane, a silicate, a titanate, and mixtures thereof,
    wherein the metal particles include at least one metal selected from the group consisting of zinc, aluminum magnesium, alloys thereof, and combinations thereof;
    wherein the metal particles have an inorganically-based surface modification and are capable of imparting cathodic corrosion protection; and
    wherein the inorganically-based surface modification is limited to a coating layer formed by an oxide selected from the group consisting of silicon dioxide, titanium oxide and mixtures thereof and has a layer thickness in the range of 3-150 nm.

* * * * *